United States Patent
Takayama et al.

(10) Patent No.: US 12,221,496 B2
(45) Date of Patent: Feb. 11, 2025

(54) FIBRILLATED CHEMICALLY MODIFIED CELLULOSE FIBER

(71) Applicant: NIPPON PAPER INDUSTRIES CO., LTD., Tokyo (JP)

(72) Inventors: Masato Takayama, Tokyo (JP); Sakiko Nakada, Tokyo (JP); Yuki Takahashi, Tokyo (JP); Shisei Goto, Tokyo (JP); Hiroyoshi Suzuki, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 392 days.

(21) Appl. No.: 17/441,356

(22) PCT Filed: Mar. 5, 2020

(86) PCT No.: PCT/JP2020/009362
§ 371 (c)(1),
(2) Date: Sep. 21, 2021

(87) PCT Pub. No.: WO2020/195671
PCT Pub. Date: Oct. 1, 2020

(65) Prior Publication Data
US 2022/0153879 A1 May 19, 2022

(30) Foreign Application Priority Data

Mar. 28, 2019 (JP) .................. 2019-063449
Mar. 28, 2019 (JP) .................. 2019-063472
Dec. 4, 2019 (JP) .................. 2019-219474

(51) Int. Cl.
*C08B 11/12* (2006.01)

(52) U.S. Cl.
CPC .................. *C08B 11/12* (2013.01)

(58) Field of Classification Search
CPC ....... A61F 7/007; A61N 1/0496; A61N 1/321; A61N 1/36014; A61N 1/36021; C08B 11/12; C08B 15/04; C08B 15/08; C08B 16/00; D21H 11/20; D21H 15/02
See application file for complete search history.

(56) References Cited

U.S. PATENT DOCUMENTS

2021/0079173 A1  3/2021  Inoue et al.

FOREIGN PATENT DOCUMENTS

| JP | 2017-110085 A | 6/2017 | |
| JP | 6505900 B1 | 4/2019 | |
| WO | WO-2014087767 A1 * | 6/2014 | ............. C08J 5/045 |
| WO | 2017/014255 A1 | 1/2017 | |
| WO | 2019/189611 A1 | 10/2019 | |
| WO | 2019/221272 A1 | 11/2019 | |

OTHER PUBLICATIONS

International Search Report and Written Opinion for Application No. PCT/JP2020/009362, dated Jun. 9, 2020, 14 pages.
European Office Action for Application No. 20777141.1, dated May 16, 2023, 7 pages.

* cited by examiner

*Primary Examiner* — Lynda Salvatore
(74) *Attorney, Agent, or Firm* — McCarter & English, LLP; Wei Song

(57) ABSTRACT

Provided is a fibrillated chemically modified cellulose fiber, which has a type-I cellulose crystallinity of at least 50%, an anionic charge density of 0.10-2.00 meq/g, and an average fiber diameter of greater than 500 nm. Also, provided is a fibrillated chemically modified cellulose fiber, wherein the value (A/B) obtained by dividing the viscosity A measured at a shear rate of 0.01/sec by the viscosity B measured at a shear rate of 1000/sec in an aqueous dispersion having a solid content of 1 mass % is at least 100. These fibers have high water retention and high thixotropy.

14 Claims, No Drawings

FIBRILLATED CHEMICALLY MODIFIED CELLULOSE FIBER

CROSS-REFERENCE TO RELATED APPLICATIONS

This application is a U.S. national stage filing, under 35 U.S.C. § 371(c), of International Application No. PCT/JP2020/009362, filed on Mar. 5, 2020, which claims priority to Japanese Patent Application No. 2019-063449, filed on Mar. 28, 2019, Japanese Patent Application No. 2019-063472, filed on Mar. 28, 2019, and Japanese Patent Application No. 2019-219474, filed on Dec. 4, 2019.

TECHNICAL FIELD

The present invention relates to a fibrillated chemically modified cellulose fiber.

BACKGROUND ART

In a papermaking process, a composition in which pulp and a pigment are dispersed in water is used. Water retentivity of such a composition is important from the viewpoints of an increase in efficiency of a production process and an enhancement in product quality. For example, water retentivity of pulp slurry serving as a raw material of base paper has a large influence on drainage at a wire and dispersibility of pulp, and consequently has a large influence on strength, air permeability resistance and/or bulkiness of paper produced. Water retentivity of a pigment coating liquid allows the degree of permeation of an adhesive into base paper to be changed and thus has a large influence on strength and/or adhesiveness of a pigment coating layer and/or base paper. In recent years, a cellulose nanofiber using cellulose as a raw material has been actively studied, and for example, PTL 1 discloses a composition including a cellulose nanofiber having a number average fiber diameter of 2 nm or more and 500 nm or less.

CITATION LIST

Patent Literature

PTL 1: Japanese Patent Laid-Open No. 2017-110085

SUMMARY OF INVENTION

Technical Problem

Cellulose nanofibers are cellulose fibers defibrated to the order of nanometers so that the average fiber diameter is less than 500 nm. In particular, a cellulose nanofiber having a fiber diameter of around 4 nm corresponds to a single microfibril serving as a base unit of a cellulose bundle in a plant cell wall. Although such a cellulose nanofiber has high thixotropy and water retentivity and can be utilized in various fields, it is very fine and thus may be sometimes difficult to use depending on the application. For example, such a cellulose nanofiber, when used in an additive for papermaking in a small amount, can have the problems of, for example, easily moving through a wire, being low in yield, and hardly imparting strength of paper. Moreover, such a cellulose nanofiber is high in production cost.

The present inventors have considered that, if a cellulose fiber lower in degree of defibration than a cellulose nanofiber can be used to allow a composition to be enhanced in water retentivity and thixotropy, an advantage obtained is that, for example, paper enhanced in strength can be produced at a low cost. An object of the present invention is to provide a fibrillated chemically modified cellulose fiber lower in degree of defibration than a cellulose nanofiber.

Solution to Problem

The present inventors have made intensive studies, and as a result, have found that chemically modified pulp can be treated by an apparatus for papermaking, such as a refiner, to thereby provide a fibrillated chemically modified cellulose fiber which has a fiber diameter only exceeding 500 nm and which is lower in degree of defibration than a cellulose nanofiber.

The present invention provides the following, but is not limited by the following.

[1] A fibrillated chemically modified cellulose fiber, wherein a degree of crystallization of cellulose type I is 50% or more, an anionic charge density is 0.10 meq/g or more and 2.00 meq/g or less, and an average fiber diameter is more than 500 nm.

[2] The fibrillated chemically modified cellulose fiber according to [1], wherein when water is used to prepare 40 mL of a slurry having a solid content of 0.3% by mass and the slurry is then subjected to centrifugation with a centrifuge at 30° C. and 25000 G for 30 minutes to separate an aqueous phase and a precipitate, a water retention ability calculated using the following expression is 15 or more:

$$\text{Water retention ability}=(B+C-0.003\times A)/(0.003\times A-C)$$

wherein A represents a mass of the slurry to be subjected to the centrifugation, B represents a mass of the precipitate separated, and C represents a mass of a solid content of the aqueous phase separated.

[3] The fibrillated chemically modified cellulose fiber according to [1] or [2], wherein a B type viscosity (25° C., 60 rpm) in the form of an aqueous dispersion having a solid content of 1% by mass is 2500 mPa·s or less.

[4] A fibrillated chemically modified cellulose fiber, wherein a value (A/B) obtained by dividing a viscosity A measured at a shear rate of 0.01/sec by a viscosity B measured at a shear rate of 1000/sec is 100 or more for an aqueous dispersion having a solid content of 1% by mass.

[5] The fibrillated chemically modified cellulose fiber according to [4], wherein the viscosity A measured at a shear rate of 0.01/sec is 1000 to 10000000 mPa·s and the viscosity B measured at a shear rate of 1000/sec is 1 to 1000 mPa·s for an aqueous dispersion having a solid content of 1% by mass.

[6] The fibrillated chemically modified cellulose fiber according to [4] or [5], wherein a viscosity (25° C., 60 rpm) in the form of an aqueous dispersion having a solid content of 1% by mass is 40 to 4000 mPa·s.

[7] The fibrillated chemically modified cellulose fiber according to any one of [4] to [6], wherein an aspect ratio is 10 to 100.

[8] The chemically modified cellulose fiber according to any one of [4] to [7], wherein a degree of crystallization of cellulose type I is 50% or more, an anionic charge density is 0.08 meq/g or more and 2.50 meq/g or less, and an average fiber diameter is more than 500 nm.

[9] The fibrillated chemically modified cellulose fiber according to any one of [1] to [8], wherein chemically modified cellulose in the fibrillated chemically modified cellulose fiber is a carboxylated cellulose obtained by oxidizing a cellulose raw material with an N-oxyl compound, a compound selected from the group consisting of bromide, iodide and a mixture thereof, and an oxidant.

[10] The fibrillated chemically modified cellulose fiber according to [9], wherein the chemically modified cellulose in the fibrillated chemically modified cellulose fiber is a carboxylated cellulose in which an amount of a carboxyl group is 0.1 to 2.5 mmol/g based on an absolute dry mass of the fibrillated chemically modified cellulose fiber.

[11] The fibrillated chemically modified cellulose fiber according to any one of [1] to [8], wherein chemically modified cellulose in the fibrillated chemically modified cellulose fiber is carboxymethylated cellulose.

[12] The fibrillated chemically modified cellulose fiber according to [11], wherein the chemically modified cellulose in the fibrillated chemically modified cellulose fiber is a carboxymethylated cellulose in which a degree of carboxymethyl substitution per glucose unit in chemically modified cellulose is 0.01 to 0.50.

Advantageous Effects of Invention

The fibrillated chemically modified cellulose fiber of the present invention has high water retention ability and high thixotropy (the value (A/B) obtained by dividing the viscosity A measured at a shear rate of 0.01/sec by the viscosity B measured at a shear rate of 1000/sec is 100 or more). Crystallinity remains in spite of chemical modification, and it is thus considered that not only the effect of imparting water retentivity due to chemical modification, but also the effect of imparting shape retentivity and strength is obtained. In particular, high thixotropy allows the effect of enhancing shape retentivity in a case of addition to a gel-like substance (for example, food and pharmaceutical products) to be obtained in an application of viscosity adjustment, such as a thickener. Fibrillation is made to such an extent that a fiber diameter of more than 500 nm is kept, and therefore the fiber diameter is not too fine (proper fibrillation). It is considered that, for example, the effect of exhibiting high water retentivity and proper thickenability as compared with a case of chemically modified cellulose not defibrated or fibrillated can be obtained. Further, it is considered that the effect of enabling, for example, an additive for papermaking even in a small amount to impart higher strength to paper as compared with a case of a finely defibrated chemically modified cellulose nanofiber can be obtained. The fibrillated chemically modified cellulose fiber of the present invention is expected to be capable of providing new effects and applications which have been hardly achieved by conventional non-fibrillated chemically modified cellulose, finely defibrated cellulose nanofiber, or chemically non-modified fibrillated cellulose.

DESCRIPTION OF EMBODIMENTS

<Chemically Modified Cellulose>

The chemically modified cellulose for use in the fibrillated chemically modified cellulose fiber of the present invention is one in which a cellulose chain constituting the fiber is chemically modified. Examples of the type of the chemically modified cellulose can include, but not limited to, a carboxylated cellulose into which a carboxyl group is introduced, a carboxyalkylated cellulose in which a carboxyalkyl group such as a carboxymethyl group is bound by an ether bond, and a phosphoric acid-esterified cellulose into which a phosphoric acid group is introduced. The type of chemical modification is preferably oxidation (carboxylation), etherification (for example, carboxyalkylataion), cationization, and esterification, and in particular, more preferably oxidation (carboxylation) and carboxyalkylation. Such a production method is described below.

The chemically modified cellulose may also be in the form of a salt, and when the "chemically modified cellulose" form is herein mentioned, salt-type chemically modified cellulose is also encompassed. Examples of the salt-type chemically modified cellulose include one which forms a metal salt such as a sodium salt.

The chemically modified cellulose for use in the fibrillated chemically modified cellulose fiber of the present invention maintains at least a part of a fibrous shape even when dispersed in water. In other words, an aqueous dispersion of a chemically modified cellulose fiber, when observed with an electron microscope or the like, can allow a fibrous substance to be observed, and when subjected to measurement with X-ray diffraction, can allow a peak of a cellulose type I crystal to be observed.

<Fibrillated Chemically Modified Cellulose Fiber>

The fibrillated chemically modified cellulose fiber of the present invention is obtained by properly beating or defibrating (fibrillating) a chemically modified cellulose raw material by use of a refiner or the like. The fibrillated chemically modified cellulose fiber exhibits fluff of cellulose microfibril on a fiber surface, as compared with a chemically modified cellulose fiber not beaten or defibrated. It is larger in fiber diameter than a chemically modified cellulose nanofiber, and has a shape where the fiber surface is efficiently fluffed (externally fibrillated) while the fiber is inhibited from being fined (internally fibrillated).

The fibrillated chemically modified cellulose fiber of the present invention has characteristics such as high water retentivity and high thixotropy due to chemical modification, as compared with a chemically non-modified fibrillated cellulose fiber.

The fibrillated chemically modified cellulose fiber of the present invention, obtained by fibrillating a chemically modified cellulose raw material, is characterized by being easily unraveled between the fibers in fibrillation because the cellulose fiber in fibrillation is chemically modified and strong hydrogen bond present between the fibers is weakened, as compared with one obtained by beating and then chemically modifying a chemically non-modified cellulose raw material.

The average fiber diameter of the fibrillated chemically modified cellulose fiber of the present invention is 500 nm or more, preferably 1 μm or more, more preferably 10 μm or more. The upper limit of the average fiber diameter is preferably 60 μm or less, more preferably 40 μm or less, further preferably 30 μm or less, further preferably 20 μm or less. Proper fibrillation is performed to such an extent that the average fiber diameter is in this range, to thereby allow high water retentivity and high thixotropy to be exhibited as compared with a non-defibrated cellulose fiber and also allow high effect of imparting strength and effect of enhancing yield to be obtained even in a small amount as compared with a finely defibrated cellulose nanofiber.

The average fiber length is preferably 200 μm or more, further preferably 250 μm or more, further preferably 300 μm or more, more preferably 500 μm or more. The upper limit of the average fiber length is not particularly limited, and is preferably 3000 μm or less, further preferably 2500 μm or less, further preferably 2000 μm or less, further preferably 1500 μm or less, further preferably 1100 μm or less, further preferably 900 μm or less. According to the present invention, a chemically modified cellulose raw material is used for beating or defibrating, to thereby enable fibrillation to progress without extreme shortening of the fiber. In addition, affinity with water is enhanced due to chemical modification, to thereby enable water retentivity to be enhanced even when the fiber length is long.

The average fiber diameter and the average fiber length can be determined by, for example, an image analysis-type fiber analyzer such as L&W Fiber Tester Plus manufactured by ABB K.K. or a fractionator manufactured by Valmet K.K. Specifically, measurement can be made by the following method:

An aqueous dispersion of a chemically modified cellulose fiber diluted to a solid content concentration of 0.25% by mass is applied to a fractionator and the length-weighted fiber width and the length-weighted average fiber length are each determined (n=2).

The aspect ratio of the fibrillated chemically modified cellulose fiber is preferably 10 or more, more preferably 15 or more, more preferably 20 or more, further preferably 30 or more. The upper limit of the aspect ratio is not particularly limited, and is preferably 1000 or less, more preferably 100 or less, further preferably 80 or less. The aspect ratio can be calculated according to the following expression:

$$\text{Aspect ratio} = \text{Average fiber length}/\text{Average fiber diameter}.$$

The rate of fibrillation (Fibrillation %) of the fibrillated chemically modified cellulose fiber, as measured with a fractionator manufactured by Valmet K.K., is preferably 1.0% or more, more preferably 1.2% or more, more preferably 1.5% or more, more preferably 2.5% or more, further preferably 3.5% or more. If the rate of fibrillation, while varies depending on the type of a cellulose raw material used, is in the above range, it is confirmed that fibrillation occurs. In the present invention, fibrillation is preferably conducted so that the rate of fibrillation ($f_0$) increases, as compared to that of a chemically modified cellulose raw material before fibrillation. When the rate of fibrillation of the fibrillated chemically modified cellulose fiber is designated as f, the difference in rate of fibrillation, $\Delta f = f - f_0$, may be more than 0, and is preferably 0.1% or more, more preferably 0.2% or more, more preferably 0.3% or more, more preferably 1.0% or more, further preferably 2.5% or more.

<Degree of Crystallization of Cellulose Type I>

The degree of crystallization of cellulose type I in the fibrillated chemically modified cellulose fiber of the present invention is 50% or more, more preferably 60% or more. The crystallinity of the cellulose can be controlled by the degree of chemical modification. The upper limit of the degree of crystallization of cellulose type I is not particularly limited. It is considered that the upper limit is practically about 90%.

The method for measuring the degree of crystallization of cellulose type I of the chemically modified cellulose fiber is as follows:

A sample is placed on a glass cell and subjected to measurement with an X-ray diffraction measurement apparatus (LabX XRD-6000, manufactured by Shimadzu Corporation). The degree of crystallization is calculated using a Segal's procedure, and calculated from the diffraction intensity of the plane (002) at $2\theta=22.6°$ and the diffraction intensity of an amorphous section at $2\theta=18.5°$, with as a baseline the diffraction intensity at $2\theta=10°$ to $30°$ in an X-ray diffraction diagram, according to the following expression.

$$Xc = (I002c - Ia)/I002c \times 100$$

Xc=Degree (%) of crystallization of cellulose type I
I002c: Diffraction intensity of plane (002) at $2\theta=22.6°$
Ia: Diffraction intensity of amorphous section at $2\theta=18.5°$.

<Anionic Charge Density>

The anionic charge density of the fibrillated chemically modified cellulose fiber of the present invention is usually 2.50 meq/g or less, preferably 2.30 meq/g or less, further preferably 2.00 meq/g or less, further preferably 1.50 meq/g or less, further preferably 1.30 meq/g or less, further preferably 1.00 meq/g or less, further preferably 0.80 meq/g or less. It is considered that a chemically modified cellulose fiber having an anionic charge density in such a range is chemically modified not locally, but uniformly in the entire cellulose, as compared with a chemically modified cellulose fiber higher in the anionic charge density, and it is considered that, in such a chemically modified cellulose fiber, an effect unique to a chemically modified cellulose fiber, for example, impartation of water retentivity can be more stably obtained. The lower limit is usually 0.08 meq/g or more, preferably 0.10 meq/g or more, further preferably 0.30 meq/g, but is not particularly limited. The anionic charge density can be calculated from the equivalent of diallyldimethylammonium chloride (DADMAC) necessary for neutralization of an anionic group in a unit mass of a chemically modified cellulose fiber. In the present invention, the method for measuring the anionic charge density is as follows:

An aqueous dispersion having a solid content of 10 g/L is prepared by dispersing a chemically modified cellulose fiber in water, and stirred with a magnetic stirrer at 1000 rpm for 10 minutes or more. A slurry obtained is diluted to 0.1 g/L, thereafter 10 ml thereof is taken, and titrated with diallyldimethylammonium chloride (DADMAC) having a normality of 1/1000 by use of a streaming current detector (Mutek Particle Charge Detector 03), and the amount of DADMAC added until the streaming current reaches zero is used to calculate the anionic charge density according to the following expression:

$$q = (V \times c)/m$$

q: Anionic charge density (meq/g)
V: Amount (L) of DADMAC added until streaming current reaches zero
c: Concentration (meq/L) of DADMAC
m: Mass (g) of chemically modified cellulose fiber in measurement sample.

<Water Retention Ability (Water Retentivity)>

The water retention ability (water retentivity) of the fibrillated chemically modified cellulose fiber of the present invention, as measured by the following method, is preferably 15 or more. The method for measuring the water retention ability is as follows:

Forty mL of a slurry (medium: water) having a solid content of 0.3% by mass of the fibrillated chemically modified cellulose fiber, is prepared. The mass of the slurry here is designated as A. Next, the total amount of the slurry is subjected to centrifugation with a high-speed cooling centrifuge at 30° C. and 25000 G for 30 minutes, to separate an aqueous phase and a precipitate. The mass of the precipitate here is designated as B. The aqueous phase is loaded in an aluminum cup and dried at 105° C. all night and all day to remove water, and the mass of the solid content in the aqueous phase is measured. The mass of the solid content in the aqueous phase is designated as C. The water retention ability is calculated using the following expression:

$$\text{Water retention ability} = (B+C-0.003 \times A)/(0.003 \times A - C).$$

As can be understood by the above expression, the water retention ability corresponds to the mass of water in the precipitate based on the mass of the solid content of the fiber in the precipitate. A larger value means a higher power of water retention by the fiber. The water retention ability of the fibrillated chemically modified cellulose fiber of the present invention is preferably 15 or more, more preferably 20 or more, further preferably 30 or more. The upper limit is not particularly limited, and is considered to be practically about 200 or less.

The method for measuring the water retention ability is directed to a fibrillated fiber, and cannot be usually applied to any fiber not fibrillated or defibrated and any cellulose nanofiber defibrated to single microfibril. If the water retention ability of a cellulose fiber not fibrillated or defibrated is tried to be measured by the above measurement method, no dense precipitate can be formed in the above centrifugation conditions and it is difficult to separate a precipitate and an aqueous phase. In addition, a cellulose nanofiber is scarcely precipitated by the above centrifugation conditions.

<B Type Viscosity>

The B type viscosity (25° C., 60 rpm) of the fibrillated chemically modified cellulose fiber of the present invention in the form of a dispersion (aqueous dispersion) with water as a dispersion medium is preferably 4000 mPa·s or less, further preferably 3000 mPa·s or less, further preferably 2000 mPa·s or less, further preferably 1500 mPa·s or less, further preferably 1000 mPa·s or less, further preferably 600 mPa·s or less, further preferably 300 mPa·s or less. The chemically modified cellulose fiber having a low B type viscosity as describe above serves as a material which is favorable in handleability, although it is fibrillated. The lower limit value of the B type viscosity is not particularly limited, and is preferably 10 mPa·s or more, more preferably 20 mPa·s or more, further preferably 40 mPa·s or more, further preferably 50 mPa·s or more, further preferably 60 mPa·s or more. In the present invention, the method for measuring the B type viscosity is as follows:

A fibrillated chemical cellulose fiber left to stand still for 1 day or more after fibrillation is weighed and taken in a polypropylene container, and dispersed in 160 ml of ion-exchange water, to adjust an aqueous dispersion so that the solid content is 1% by mass. The aqueous dispersion is left to stand still in a water bath whose temperature is regulated to 25° C., for 3 hours. Thereafter, the viscosity after 1 minute at a rotational speed of 60 rpm is measured with a B type viscometer (manufactured by Toki Sangyo Co., Ltd.) according to a method of JIS-Z-8803.

<Thixotropy>

The value (A/B) obtained by dividing the viscosity A measured at a shear rate of 0.01/sec by the viscosity B measured at a shear rate of 1000/sec for the fibrillated chemically modified cellulose fiber of the present invention is preferably 100 or more, when in the form of an aqueous dispersion having a solid content of 1% by mass. The A/B is more preferably 500 or more, further preferably 1000 or more. A higher A/B exhibits higher thixotropy. The upper limit of the A/B is not particularly limited, and is practically about 20000.

Thixotropy refers to the property of leading to a gradual reduction in viscosity due to reception of shear stress and a gradual increase in viscosity due to still standing. The viscosity A is preferably 1000 mPa·s or more, further preferably 1500 mPa·s or more, further preferably 2000 mPa·s or more. The upper limit value of the viscosity A is preferably 10000000 mPa or less, further preferably 5000000 mPa·s or less, further preferably 3000000 mPa·s or less. The viscosity B is preferably 1000 mPa·s or less, further preferably 500 mPa·s or less, further preferably 300 mPa·s or less, further preferably 100 mPa·s or less. The lower limit value of the viscosity B is preferably 1 mPa·s or more, further preferably 10 mPa·s or more. In the present invention, the method for measuring the viscosities A and B is as follows:

Water is added to a chemically modified cellulose fiber to prepare an aqueous dispersion having a solid content of 1.0% by mass. The aqueous dispersion obtained is adjusted to 25° C., and the viscosity A and the viscosity B are respectively measured at a shear rate of 0.01/sec and at a shear rate of 1000/sec with a viscoelastic rheometer MCR301 (manufactured by Anton Paar Japan K.K.). A parallel plate (PP25) is used in the measurement, and the gap in a measurement section is 1 mm.

<Others>

The fibrillated chemically modified cellulose fiber of the present invention, when in the form of an aqueous dispersion having a solid content concentration of 1.0% by mass, preferably has an electric conductivity of 500 mS/m or less, more preferably 300 mS/m or less, further preferably 200 mS/m or less, further preferably 100 mS/m or less, further preferably 70 mS/m or less. The lower limit of the electric conductivity is preferably 5 mS/m or more, more preferably 10 mS/m or more. The electric conductivity can be measured by the following method:

Two hundred grams of an aqueous dispersion having a solid content of the fibrillated chemically modified cellulose fiber of 1.0% by mass is prepared and sufficiently stirred. Thereafter, the electric conductivity is measured with an electric conductivity meter (ES-71 model manufactured by Horiba Ltd.).

The BET specific surface area of the fibrillated chemically modified cellulose fiber of the present invention is preferably 30 $m^2/g$ or more, more preferably 50 $m^2/g$ or more, further preferably 70 $m^2/g$ or more, further preferably 100 $m^2/g$ or more. If the BET specific surface area is high, an advantage is that, for example, bonding to pulp is facilitated in a case of use as an additive for papermaking, to result in an enhancement in yield and an improvement in effect of imparting strength to paper. The BET specific surface area can be measured by the following method with reference to a nitrogen gas adsorption method (JIS Z 8830):

(1) A slurry (dispersion medium: water) of the fibrillated chemically modified cellulose fiber at about 2% is taken so that the solid content is about 0.1 g, and loaded in a centrifugation container, and 100 ml of ethanol is added thereto.

(2) A stir bar is put in for stirring at 500 rpm for 30 minutes or more.

(3) The stir bar is taken out, and the fibrillated chemically modified cellulose fiber is precipitated by a centrifuge in condition of 7000 G, 30 minutes, and 30° C.

(4) While the fibrillated chemically modified cellulose fiber is not removed as much as possible, a supernatant is removed.

(5) One hundred ml of ethanol is added, a stir bar is added, and stirring in condition (2), centrifugation in condition (3) and supernatant removal in condition (4) are made and these are repeated three times.

(6) The solvent in (5) is changed from ethanol to t-butanol, and stirring, centrifugation and supernatant removal are repeated at room temperature equal to or more than the melting point of t-butanol three times in the same manner as in (5).

(7) After the last solvent removal, 30 ml of t-butanol is added and lightly mixed, then the resultant is transferred to an eggplant flask and frozen with an ice bath.

(8) Cooling is made by a freezer for 30 minutes or more.

(9) Attachment to a freeze-dryer and freeze-drying for 3 days are made.

(10) BET measurement is conducted (pre-treatment conditions: at 105° C. for 2 hours under a nitrogen stream, a relative pressure of 0.01 to 0.30, and an amount of a sample of about 30 mg).

The Schopper Riegler freeness of the fibrillated chemically modified cellulose fiber of the present invention is not particularly limited, and is preferably 1° SR or more, more preferably 10° SR or more, more preferably 25° SR or more. The method for measuring the Schopper Riegler freeness is according to JIS P 82121-1:2012, and is specifically as follows:

An aqueous dispersion having a solid content of 10 g/L is prepared by dispersing the fibrillated chemically modified cellulose fiber in water, and stirred with a magnetic stirrer at 1000 rpm for 10 minutes or more. A slurry obtained is diluted to 2 g/L. A 60-mesh screen (wire thickness: 0.17 mm) is set on DFR-04 manufactured by Mutech Co., Ltd., the amount of a test liquid passing through the mesh, of 1000 ml of a test liquid, is measured for 60 seconds, and the Schopper Riegler freeness is calculated by a method according to JIS P 8121-1:2012.

The Schopper Riegler freeness is for measuring the degree of drainage of a suspension of the fiber, the lower limit value is 0° SR and the upper limit value is 100° SR, and a Schopper Riegler freeness closer to 100° SR exhibits less drainage (less amount of draining). The Schopper Riegler freeness of the fibrillated chemically modified cellulose fiber of the present invention is not particularly limited, and the lower limit is preferably 1° SR or more, more preferably 10° SR or more, more preferably 25° SR or more, more preferably 40° SR or more, further preferably 50° SR or more. The upper limit is not particularly limited, and is 100° SR or less.

The transparency (transmittance of light at 660 nm) of the fibrillated chemically modified cellulose fiber of the present invention, in the form of an aqueous dispersion having a solid content of 1% by mass, is preferably less than 60%, further preferably 40% or less, further preferably 30% or less, further preferably 20% or less, further preferably 10% or less. The lower limit is not particularly limited, and may be 0% or more. When the transparency is in such a range, the degree of fibrillation is proper and the effects of the present invention are easily obtained. The transparency can be measured by the following method:

An aqueous dispersion (solid content 1% (w/v), dispersion medium: water) of the fibrillated chemically modified cellulose fiber is prepared, and the transmittance of light at a wavelength of 660 nm is measured using a square cell whose optical path length is 10 mm, with a UV-VIS spectrophotometer UV-1800 (manufactured by Shimadzu Corporation).

The fibrillated chemically modified cellulose fiber of the present invention is in the form of a translucent to white gel, cream or paste at a solid content concentration of about 2% or more, when the dispersion medium is water.

The fibrillated chemically modified cellulose fiber may be in the state of being a dispersion obtained after production, and may be, if necessary, dried, or may be re-dispersed in water. The drying method is not limited at all, and, for example, a known method such as a freeze-drying method, a spray-drying method, a shelf-type drying method, a drum drying method, a belt drying method, a drying method involving thinly extending on a glass plate or the like, a fluid-bed drying method, a microwave drying method, or a drying method with a heat generating fan under reduced pressure can be used. After the drying, pulverization may be made by a cutter mill, a hammer mill, a pin mill, a jet mill, or the like, if necessary. The method for re-dispersing in water is also not particularly limited, and a known dispersing apparatus can be used.

The application of the fibrillated chemically modified cellulose fiber is not particularly limited, and the fibrillated chemically modified cellulose fiber of the present invention is excellent in thixotropy and water retentivity and thus is considered to be able to be particularly optimally used in an application where shape retentivity and water retentivity are required. In addition, the degree of defibration is not too high and a proper fiber diameter is retained, and therefore it is considered that there can be particularly optimally used in an application where fiber strength is required or an application where a high yield of fiber is demanded. However, there may also be used in any application other than the above. The field in which the fibrillated chemically modified cellulose fiber is used is not limited, and it is considered that the fibrillated chemically modified cellulose fiber can be used in various fields where an additive is generally used, for example, foods, feed cosmetic products, medicines, papermaking, various chemical products, coating materials, sprays, agricultural chemicals, civil engineering, architectures, electronic materials, flame retardants, household products, adhesives, detergents, aromatic substances, lubricating compositions, thickeners, gelling agents, pasting agents, food additives, excipients, additives for coating materials, additives for adhesives, additives for papermaking, polishing agents, compounding materials for rubber/plastics, water retaining agents, shape retaining agents, muddy water modifiers, filtration aids, and mud overflow inhibitors.

In use for foods, for example, the fibrillated chemically modified cellulose fiber can be used as, for example, an agent for imparting water retentivity, an agent for imparting shape retentivity, a viscosity modifier, an emulsion stabilizer or a dispersion stabilizer, but not limited thereto. Examples of such a food in which the fibrillated chemically modified cellulose fiber can be used include, but not limited to, beverages (cocoa, fiber/fruit pulp-containing juice, sweet red-bean soup, amazake, probiotic drinks, fruit milk, and the like), soups (corn soup, ramen soup, miso soup, consomme, and the like), sauces, dressing, ketchup, mayonnaise, jam, yogurt, whip cream, dry foods (dry processed food, instant noodle, pasta noodle, and the like), gluten-free pasta, ice cream, bean-jam-filled wafers, sherbet, polyjuice, confectionery (gummi candy, soft candy, jelly, cookie, and the like), merengue, breads, gluten-free breads, fillings, pancakes, pastes, and edible films.

In a case of addition into such a food, the amount added can be appropriately selected depending on the effect expected, and is, for example, preferably 0.1 to 20% by mass, further preferably 0.5 to 15% by mass, more preferably 0.5 to 10% by mass based on the total mass of such a food.

In use for pharmaceutical products, for example, the fibrillated chemically modified cellulose fiber can be used as, for example, an agent for imparting water retentivity, an agent for imparting shape retentivity, a viscosity modifier, an emulsion stabilizer or a dispersion stabilizer, but not limited thereto. Examples of such a pharmaceutical product in which the fibrillated chemically modified cellulose fiber can be used include, but not limited to, a tablet, an ointment, an adhesive tape, a poultice, hand cream, and toothpaste.

In a case of addition into such a pharmaceutical product, the amount added can be appropriately selected depending on the effect expected, and is, for example, preferably 0.1 to 30% by mass, further preferably 0.5 to 20% by mass, more preferably 0.5 to 10% by mass based on the total mass of such a pharmaceutical product.

In use for cosmetic products, for example, the fibrillated chemically modified cellulose fiber can be used as an agent for imparting water retentivity, an agent for imparting shape retentivity, a viscosity modifier, an emulsion stabilizer or a dispersion stabilizer, but not limited thereto. Examples of such a cosmetic product in which the fibrillated chemically modified cellulose fiber can be used include, but not limited to, a face powder, foundation, a scrub agent for face washing, a pack, cleansing foam, cleansing cream, a hair mousse, a shampoo, soap, a lotion, a hair color, a hair bleaching agent, mascara, an eyeliner, a manicure, and an antiperspirant.

In a case of addition into such a cosmetic product, the amount added can be appropriately selected depending on the effect expected, and is, for example, preferably 0.1 to 30% by mass, further preferably 0.5 to 20% by mass, more preferably 0.5 to 10% by mass based on the total mass of such a cosmetic product.

In use for feed, for example, the fibrillated chemically modified cellulose fiber can be used as, for example, an agent for imparting water retentivity, an agent for imparting shape retentivity, a viscosity modifier, an emulsion stabilizer or a dispersion stabilizer, but not limited thereto. Examples of such feed in which the fibrillated chemically modified cellulose fiber can be used include, but not limited to, a moist pellet and an expansion pellet for domestic animals or cultured fishes, and a milk substitute for cattle.

In a case of addition into such feed, the amount added can be appropriately selected depending on the effect expected, and is, for example, preferably 0.1 to 20% by mass, further preferably 0.5 to 15% by mass, more preferably 0.5 to 10% by mass based on the total mass of such feed.

In use for papermaking, examples include an agent for imparting water retentivity, an agent for imparting shape retentivity, a viscosity modifier, an emulsion stabilizer, and a dispersion stabilizer. For example, the fibrillated chemically modified cellulose fiber can be used as a chemical product for papermaking, such as a surface sizing agent, a yield improver, a paper strengthening agent, a coating agent, or an additive for bulky paper.

In a case of use as the chemical product for papermaking, the amount added can be appropriately selected depending on the effect expected, and is, for example, preferably 0.1 to 30% by mass, further preferably 0.5 to 20% by mass, more preferably 0.5 to 10% by mass based on the total mass of the chemical product for papermaking.

In use for coating materials, for example, the fibrillated chemically modified cellulose fiber can be used as an agent for imparting water retentivity, an agent for imparting shape retentivity, a viscosity modifier, an emulsion stabilizer or a dispersion stabilizer, but not limited thereto. Examples of such a coating material in which the fibrillated chemically modified cellulose fiber can be used include, but not limited to, a matt coating material, a coating material for architectures, and a coating material for automobiles.

In a case of addition into such a coating material, the amount added can be appropriately selected depending on the effect expected, and is, for example, preferably 0.1 to 30% by mass, further preferably 0.5 to 20% by mass, more preferably 0.5 to 10% by mass based on the total mass of such a coating material.

<Method for Producing Fibrillated Chemically Modified Cellulose Fiber>

The fibrillated chemically modified cellulose fiber of the present invention can be produced by first preparing a chemically modified cellulose raw material, and then fibrillating it. Examples of the type of chemical modification can include, as described above, carboxylation, carboxyalkylation and phosphoric acid-esterification of cellulose, but not limited thereto. The chemically modified cellulose raw material to be subjected to fibrillation may be a commercially available product, or may be produced by, for example, chemically modifying a cellulose raw material described below, by a method described below.

<Cellulose Raw Material>

The cellulose serving as a raw material of the fibrillated chemically modified cellulose fiber of the present invention is not particularly limited, and examples include those derived from plants, animals (for example, sea squirt), algae, microorganisms (for example, acetic acid bacterium (acetobacter)), and microorganism products. Examples of those derived from plants include wood, bamboo, hemp, jute, kenaf, a farm waste, cloth, and pulp (needle unbleached kraft pulp (NUKP), needle bleached kraft pulp (NBKP), leaf unbleached kraft pulp (LUKP), leaf bleached kraft pulp (LBKP), needle unbleached sulfite pulp (NUSP), needle bleached sulfite pulp (NBSP), thermomechanical pulp (TMP), needle dissolving pulp, leaf dissolving pulp, recycled pulp, waste paper, and the like). A cellulose powder obtained by subjecting the above cellulose raw material to a pulverizing treatment may also be used. The cellulose raw material used may be any or a combination of those described above, and is preferably a cellulose fiber derived from a plant or microorganism, more preferably a cellulose fiber derived from a plant, further preferably wood-based pulp.

In order that a degree of crystallization of cellulose type I of 50% or more is maintained in the fibrillated chemically modified cellulose fiber, cellulose high in degree of crystallization of cellulose type I is preferably used as a raw material. The degree of crystallization of cellulose type I of such a cellulose raw material is preferably 70% or more, further preferably 80% or more. The method for measuring the degree of crystallization of cellulose type I is the same as described above.

<Carboxylation of Cellulose Raw Material>

A carboxylated (introduction of a carboxyl group into cellulose, also referred to as "oxidized") cellulose raw material can be used as one example of the chemically modified cellulose raw material. Such a carboxylated cellulose raw material (also referred to as "oxidized cellulose raw material") may be a commercially available product, or may be produced by carboxylating (oxidizing) the cellulose raw material by a known method. The amount of a carboxyl group is preferably 0.1 to 2.5 mmol/g, further preferably 0.6 mmol/g to 2.5 mmol/g, further preferably 1.0 mmol/g to 2.0 mmol/g based on the absolute dry mass of the carboxylated cellulose fiber.

The amount of a carboxyl group in the carboxylated cellulose can be measured by the following method:

After 60 ml of a 0.5% by mass slurry (aqueous dispersion liquid) of carboxylated cellulose is prepared and the pH is set to 2.5 by addition of an aqueous 0.1 M hydrochloric acid solution, an aqueous 0.05 N sodium hydroxide solution is dropped to measure the electric conductivity until the pH is 11, and calculation from the amount (a) of sodium hydroxide consumed in neutralization of weak acid mild in change in electric conductivity is made using the following expression:

Amount of carboxyl group [mmol/g of carboxylated cellulose]=a [ml]×0.05/Mass [g] of carboxylated cellulose.

The amount of a carboxyl group in the carboxylated cellulose raw material before fibrillation and the amount of a carboxyl group in the carboxylated cellulose fiber after fibrillation are usually the same.

Examples of the carboxylation (oxidation) method can include a method for oxidizing the cellulose raw material with an oxidant in water in the presence of an N-oxyl compound and a compound selected from the group consisting of bromide, iodide or a mixture thereof. This oxidation reaction enables a primary hydroxyl group at the C6 position of the glucopyranose ring on the cellulose surface to be selectively oxidized, to thereby obtain a cellulose raw material having an aldehyde group and a carboxyl group (—COOH) or a carboxylate group (—COO$^-$), on the surface. The concentration of the cellulose raw material in the reaction is not particularly limited, and is preferably 5% by mass or less.

The N-oxyl compound refers to a compound capable of generating a nitroxy radical. The N-oxyl compound used can be any compound as long as it is a compound which promotes an objective oxidation reaction. Examples include 2,2,6,6-tetramethylpiperidine-1-oxy radical (TEMPO) and a derivative thereof (for example, 4-hydroxy TEMPO). The amount of the N-oxyl compound used may be a catalyst amount which enables the cellulose raw material to be oxidized, and is not particularly limited. For example, the amount used is preferably 0.01 mmol to 10 mmol, more preferably 0.01 mmol to 1 mmol, further preferably 0.05 mmol to 0.5 mmol per g of the cellulose raw material absolutely dried. The amount used may be about 0.1 mmol/L to 4 mmol/L relative to the reaction system.

The bromide is a compound including bromine, and examples thereof include an alkali metal bromide which can be dissociated in water and ionized. The iodide is a compound including iodine, and examples thereof include an alkali metal iodide. The amount of the bromide or the iodide used can be selected to the extent that the oxidation reaction can be promoted. The total amount of the bromide and the iodide is, for example, preferably 0.1 mmol to 100 mmol, more preferably 0.1 mmol to 10 mmol, further preferably 0.5 mmol to 5 mmol per g of the cellulose raw material absolutely dried.

The oxidant used can be known one and, for example, halogen, hypohalous acid, halous acid, perhalogen acid, or a salt thereof, halogen oxide, or peroxide can be used. In particular, inexpensive and environment-friendly sodium hypochlorite is preferable. An appropriate amount of the oxidant used is, for example, preferably 0.5 mmol to 500 mmol, more preferably 0.5 mmol to 50 mmol, further preferably 1 mmol to 25 mmol, most preferably 3 mmol to 10 mmol per g of the cellulose raw material absolutely dried. The amount used is, for example, preferably 1 mol to 40 mol per mol of the N-oxyl compound.

The oxidation step of the cellulose raw material allows the reaction to efficiently progress even in relative mild conditions. Accordingly, the reaction temperature is preferably 4° C. to 40° C., or may be any room temperature of about 15° C. to 30° C. A carboxyl group is generated in a cellulose chain along with progress of the reaction, and thus a reaction liquid is confirmed to be reduced in pH. In order that the oxidation reaction is allowed to efficiently progress, the pH of the reaction liquid is preferably kept at 8 to 12, preferably about 10 to 11 by addition of an alkaline solution such as an aqueous sodium hydroxide solution. The reaction medium is preferably water because handling is easy and a side reaction hardly occurs. The reaction time in the oxidation reaction can be appropriately set along with the degree of progress of oxidation, and is usually 0.5 hours to 6 hours, for example, about 0.5 hours to 4 hours.

The oxidation reaction may be performed separately at two stages. For example, an oxidized cellulose obtained by filtration and separation after the first stage of the reaction can be oxidized again in the same or different conditions, to result in efficient oxidation without reaction inhibition due to common salt as a by-product at the first stage of the reaction.

Other examples of the carboxylation (oxidation) method can include a method of oxidation by contacting an ozone-containing gas with the cellulose raw material. This oxidation reaction not only allows hydroxyl groups at least at the 2- and 6-positions of the glucopyranose ring to be oxidized, but also allows a cellulose chain to be decomposed. The ozone concentration in the ozone-containing gas is preferably 50 g/m$^3$ to 250 g/m$^3$, more preferably 50 g/m$^3$ to 220 g/m$^3$. The amount of ozone added to the cellulose raw material is preferably 0.1 parts by mass to 30 parts by mass, more preferably 5 parts by mass to 30 parts by mass under the assumption that the solid content of the cellulose raw material is 100 parts by mass. The ozone treatment temperature is preferably 0° C. to 50° C., more preferably 20° C. to 50° C. The ozone treatment time is not particularly limited, and is about 1 minute to 360 minutes, preferably about 30 minutes to 360 minutes. If conditions of the ozone treatment fall within these ranges, the cellulose raw material can be prevented from being excessively oxidized and decomposed, and the yield of the oxidized cellulose is improved. After the ozone treatment is carried out, an additional oxidation treatment may also be conducted with an oxidant. The oxidant for use in the additional oxidation treatment is not particularly limited, and examples include chlorine-based compounds such as chlorine dioxide and sodium chlorite, and oxygen, hydrogen peroxide, persulfuric acid, and peracetic acid. For example, the additional oxidation treatment can be conducted by dissolving such an oxidant in water or a polar organic solvent such as alcohol to produce an oxidant solution, and immersing the cellulose raw material in the solution.

The amount of a carboxyl group in the carboxylated cellulose raw material can be adjusted by controlling reaction conditions, for example, the amount of the above oxidant and the reaction time.

<Carboxyalkylation of Cellulose Raw Material>

One example of the chemically modified cellulose raw material used can be a cellulose raw material in which a carboxyalkyl group such as a carboxymethyl group is bound by an ether-bond (carboxyalkylated cellulose raw material). Such a raw material used may be a commercially available product, or may be produced by carboxyalkylating a cellulose raw material by a known method. The degree of carboxyalkyl substitution per anhydrous glucose unit of the cellulose is preferably 0.01 to 0.50. The upper limit is preferably 0.40 or less. A degree of carboxyalkyl substitution of more than 0.50 causes dissolution in water to easily occur, and cannot allow a fiber form to be maintained in water. To obtain the effect due to calboxyalkylation, it is necessary to have a degree of substitution at a certain level or more. For example, a degree of substitution of less than 0.02 may sometimes impart no advantage due to introduction of a carboxyalkyl group, depending on the application. Accordingly, the degree of carboxyalkyl substitution is preferably 0.02 or more, further preferably 0.05 or more, further preferably 0.10 or more, further preferably 0.15 or more, further preferably 0.20 or more, further preferably 0.25 or more. The degree of carboxyalkyl substitution can be adjusted by controlling, for example, the amount of addition of a carboxyalkylating agent to be reacted, the amount of a mercerizing agent, and the compositional ratio of water and an organic solvent.

The anhydrous glucose unit herein means each anhydrous glucose (glucose residue) constituting cellulose. The degree of carboxyalkyl substitution (also referred to as "degree of etherification".) represents the proportion of hydroxyl group(s) substituted with carboxyalkyl ether group(s) relative to hydroxyl groups in a glucose residue constituting cellulose (number of carboxyalkyl ether groups per glucose residue). The degree of carboxyalkyl substitution may be abbreviated as DS.

The method for measuring the degree of carboxyalkyl substitution is as follows:

A 300-mL conical flask equipped with a stopper is loaded with about 2.0 g of a sample precisely weighed. One hundred mL of nitric acid/methanol (liquid obtained by adding 100 mL of conc. nitric acid (special grade) to 1000 mL of methanol) is added, and shaken for 3 hours, to convert salt-type carboxyalkylated cellulose to hydrogen-type carboxyalkylated cellulose. A 300-mL conical flask equipped with a stopper is loaded with 1.5 to 2.0 g of hydrogen-type carboxyalkylated cellulose (absolute dry) precisely weighed. Wetting is made by 15 mL of 80% methanol, 100 mL of 0.1 N—NaOH is added, and shaking at room temperature is made for 3 hours. Phenolphthalein is used as an indicator to reversely titrate excess NaOH by 0.1 N—$H_2SO_4$, and the degree of carboxyalkyl substitution (DS value) is calculated according to the following expressions.

$$A=[(100\times F'-0.1N\text{—}H_2SO_4(mL)\times F)\times 0.1]/(\text{Absolute dry mass(g) of hydrogen-type carboxyalkylated cellulose})$$

Degree of carboxyalkyl substitution=$0.162\times A/(1-0.058\times A)$
F': Factor of 0.1 N—$H_2SO_4$
F: Factor of 0.1 N—NaOH.

The degree of carboxyalkyl substitution in the carboxyalkylated cellulose raw material before fibrillation and the degree of carboxyalkyl substitution in the carboxyalkylated cellulose fiber after fibrillation are usually the same.

A production example of the carboxymethylated cellulose raw material is described below, as one example of the method for producing the carboxyalkylated cellulose raw material.

First, the cellulose raw material is mixed with a solvent and a mercerizing agent, and the cellulose raw material is mercerized at a reaction temperature of 0 to 70° C., preferably 10 to 60° C., for a reaction time of 15 minutes to 8 hours, preferably 30 minutes to 7 hours. Next, 0.05 to 10.0 times by mol per glucose residue, of a carboxymethylating agent, is added, to conduct carboxymethylation at a reaction temperature of 30 to 90° C., preferably 40 to 80° C., for a reaction time of 30 minutes to 10 hours, preferably 1 hour to 4 hours.

The solvent used can be water or an organic solvent, or a mixture thereof, 3 to 20 times by mass, and examples of the organic solvent can include, but not limited to, alcohols such as methanol, ethanol, n-propyl alcohol, isopropyl alcohol, n-butanol, isobutanol and tert-butanol, ketones such as acetone, diethyl ketone and methyl ethyl ketone, and dioxane, diethyl ether, benzene, and dichloromethane. In particular, a monohydric alcohol having 1 to 4 carbon atoms is preferable, and a monohydric alcohol having 1 to 3 carbon atoms is further preferable, because compatibility with water is excellent. The mercerizing agent used is preferably alkali metal hydroxide, specifically sodium hydroxide or potassium hydroxide, 0.5 to 20 times by mol per anhydrous glucose residue of the cellulose raw material. Examples of the carboxymethylating agent include monochloroacetic acid, sodium monochloroacetate, methyl monochloroacetate, ethyl monochloroacetate, and isopropyl monochloroacetate. In particular, monochloroacetic acid or sodium monochloroacetate is preferable from the viewpoint of availability of a raw material. The carboxymethylating agent used is not particularly limited in terms of the amount used, and in one embodiment, is preferably added in a range from 0.5 to 1.5 mol per anhydrous glucose unit of cellulose. The lower limit in such a range is more preferably 0.6 mol or more, further preferably 0.7 mol or more, and the upper limit is more preferably 1.3 mol or less, further preferably 1.1 mol or less. The carboxymethylating agent, for example, can be added as 5 to 80% by mass, more preferably 30 to 60% by mass of an aqueous solution, to a reactor, or can also be added in the form of a powder without dissolution, but not limited thereto.

The molar ratio between the mercerizing agent and the carboxymethylating agent (mercerizing agent/carboxymethylating agent), adopted, is generally 0.90 to 2.45 when monochloroacetic acid or sodium monochloroacetate is used as the carboxymethylating agent. The reason for this is because a molar ratio of less than 0.90 can sometimes lead to an insufficient carboxymethylation reaction, to cause the unreacted monochloroacetic acid or sodium monochloroacetate to remain, resulting in waste, and a molar ratio of more than 2.45 may cause a side reaction of an excess mercerizing agent with monochloroacetic acid or sodium monochloroacetate to progress, resulting in generation of a glycolic acid alkali metal salt, and thus can lead to diseconomy.

When carboxymethylation of the cellulose raw material is conducted, a method involving conducting both mercerization and carboxymethylation in a solvent mainly containing water (water-mediated method) and a method involving conducting both mercerization and carboxymethylation in a mixed solvent of water and an organic solvent (solvent-mediated method) are usually known. In the present invention, a solvent mainly containing water may be used in mercerization and a mixed solvent of an organic solvent and water may be used in carboxymethylation. Thus, even when the degree of crystallization of cellulose is kept at 50% or more, a carboxymethylated cellulose raw material where a carboxymethyl group is introduced not locally, but uniformly (namely, the absolute value of the anionic charge density is small) can be economically obtained. Specifically, for example, a carboxymethylated cellulose raw material can be obtained where the degree of crystallization of cellulose type I is 50% or more, the degree of carboxymethyl substitution is 0.20 or more and 0.50 or less, and the anionic charge density is 0.10 meq/g or more and 2.00 meq/g or less, but not limited thereto.

A solvent mainly containing water refers to a solvent that contains water at a proportion of more than 50% by mass. The solvent mainly containing water preferably contains 55% by mass or more, more preferably 60% by mass or more, more preferably 70% by mass or more, more preferably 80% by mass or more, further preferably 90% by mass or more, further preferably 95% by mass or more of water.

Particularly preferably, the solvent mainly containing water contains 100% by mass of water (namely, water). An advantage obtained is that, as the proportion of water in mercerization is higher, a carboxymethyl group is more uniformly introduced into cellulose. The above organic solvent can be used as a solvent other than water (the above organic solvent can be used in combination with water), in the solvent mainly containing water. The amount of the organic solvent in the solvent mainly containing water is preferably 45% by mass or less, further preferably 40% by mass or less, further preferably 30% by mass or less, further preferably 20% by mass or less, further preferably 10% by mass or less, further preferably 5% by mass or less, more preferably 0% by mass.

It is preferable to allow the carboxymethylation reaction to progress by appropriately adding the organic solvent or an aqueous solution of the organic solvent to a reactor at the same time as addition of the carboxymethylating agent, or before or immediately after addition of the carboxymethylating agent, or by appropriately reducing the organic solvent other than water in a mercerization treatment using depressurization, to thereby form a mixed solvent of water and the organic solvent, and use of the mixed solvent of water and the organic solvent in the carboxymethylation reaction. The timing of addition or reduction of the organic solvent may be between completion of the mercerization reaction and immediate aftermath of addition of the carboxymethylating agent, and is, for example, preferably within 30 minutes before and after addition of the carboxymethylating agent.

The proportion of the organic solvent in the mixed solvent in carboxymethylation is preferably 20% by mass or more, more preferably 30% by mass or more, further preferably 40% by mass or more, further preferably 45% by mass or more, particularly preferably 50% by mass or more in terms of the organic solvent based on the sum of water and the organic solvent. A higher proportion of the organic solvent allows uniform substitution with a carboxymethyl group to more easily occur, resulting in stabilization of quality of the carboxymethylated cellulose raw material obtained. The upper limit of the proportion of the organic solvent is not limited, and may be, for example, 99% by mass or less. It is preferably 90% by mass or less, further preferably 85% by mass or less, further preferably 80% by mass or less, further preferably 70% by mass or less in consideration of the cost of the organic solvent to be added.

A reaction medium (mixed solvent of water and the organic solvent, including no cellulose) in carboxymethylation is preferably lower in proportion of water (in other words, higher in proportion of the organic solvent) than a reaction medium in mercerization. If this is satisfied, the degree of crystallization of the resulting carboxymethylated cellulose raw material can be easily maintained, and the fiber of the present invention can be thus more efficiently obtained. When the reaction medium in carboxymethylation is lower in proportion of water (higher in proportion of the organic solvent) than the reaction medium in mercerization, an advantage obtained is also that the mixed solvent for the carboxymethylation reaction can be formed by a simple procedure involving adding a desired amount of the organic solvent to the reaction system after completion of the mercerization reaction, during transferring from the mercerization reaction to the carboxymethylation reaction.

The rate of effective utilization of the carboxymethylating agent in carboxymethylation is preferably 15% or more, more preferably 20% or more, further preferably 25% or more, particularly preferably 30% or more. The rate of effective utilization of the carboxymethylating agent refers to the proportion of a carboxymethyl group introduced into cellulose, as a carboxymethyl group in the carboxymethylating agent. The solvent mainly containing water can be used in mercerization and the mixed solvent of water and an organic solvent can be used in carboxymethylation, to thereby obtain the carboxymethylated cellulose raw material at a high rate of effective utilization of the carboxymethylating agent (namely, economically without any significant increase in amount of the carboxymethylating agent used). The upper limit of the rate of effective utilization of the carboxymethylating agent is not particularly limited, and the upper limit is practically about 80%. The rate of effective utilization of the carboxymethylating agent may be here abbreviated as AM.

The method for calculating the rate of effective utilization of the carboxymethylating agent is as follows:

$$AM = (DS \times \text{Molar number of cellulose}) / \text{Molar number of carboxymethylating agent}$$

DS: degree of carboxymethyl substitution (the measurement method is described below)
Molar number of cellulose: Mass of pulp (Dry mass in drying at 100° C. for 60 minutes)/162 (162 is a molecular weight per glucose unit of cellulose).

<Phosphoric Acid-Esterification of Cellulose Raw Material>

A phosphoric acid-esterified cellulose raw material can be used as one example of the chemically modified cellulose raw material. Examples of the esterification method include a method involving mixing a powder or an aqueous solution of a phosphoric acid group-containing compound with the cellulose raw material, and a method involving adding an aqueous solution of a phosphoric acid group-containing compound to a slurry of the cellulose raw material. Examples of the phosphoric acid group-containing compound include phosphoric acid, sodium dihydrogen phosphate, disodium hydrogen phosphate, trisodium phosphate, sodium phosphite, potassium phosphite, sodium hypophosphite, potassium hypophosphite, sodium pyrophosphate, sodium metaphosphate, potassium dihydrogen phosphate, dipotassium hydrogen phosphate, tripotassium phosphate, potassium pyrophosphate, potassium metaphosphate, ammonium dihydrogen phosphate, diammonium hydrogen phosphate, triammonium phosphate, ammonium pyrophosphate, and ammonium metaphosphate. These can be used singly or in combinations of two or more kinds thereof to introduce a phosphoric acid group into the cellulose raw material. In particular, phosphoric acid, a sodium salt of phosphoric acid, a potassium salt of phosphoric acid, and an ammonium salt of phosphoric acid are preferable from the viewpoints of a high efficiency of introduction of the phosphoric acid group, easy defibration in the following defibrating step, and industrially easy application. In particular, sodium dihydrogen phosphate and disodium hydrogen phosphate are preferable. The phosphoric acid group-containing compound is desirably used in the form of an aqueous solution because the reaction can be allowed to uniformly progress and the efficiency of introduction of the phosphoric acid group increases. The pH of the aqueous solution of the phosphoric acid group-containing compound is preferably 7 or less because the efficiency of introduction of the phosphoric acid group increases, and the pH is preferably 3 to 7 from the viewpoint of suppression of hydrolysis of the fiber.

Examples of the method for producing the phosphoric acid-esterified cellulose raw material can include the following method. The phosphoric acid group-containing compound is added to a suspension having a solid content concentration of the cellulose raw material of 0.1 to 10% by mass, with stirring, to introduce the phosphoric acid group into cellulose. The amount of the phosphoric acid group-containing compound added is preferably 0.2 to 500 parts by mass, more preferably 1 to 400 parts by mass in terms of amount of a phosphorus element, under the assumption that the cellulose raw material corresponds to 100 parts by mass.

A suspension of the resulting phosphoric acid-esterified cellulose raw material is dehydrated, and thereafter preferably treated with heating at 100 to 170° C. from the viewpoint of suppression of hydrolysis of cellulose. Furthermore, when water is present during such a heating treatment, water is preferably removed by heating at 130° C. or less, preferably 110° C. or less and thereafter a heating treatment at 100° C. to 170° C. is preferably made.

The degree of phosphoric acid group substitution per glucose unit in the phosphoric acid-esterified cellulose raw material is preferably 0.001 or more and less than 0.40. The degree of phosphoric acid group substitution in the phosphoric acid-esterified cellulose raw material before fibrillation and the degree of phosphoric acid group substitution in the phosphoric acid-esterified cellulose fiber after fibrillation are usually the same.

<Fibrillation>

The fibrillated chemically modified cellulose fiber is obtained by defibrating or beating the chemically modified cellulose raw material. Such defibrating or beating in fibrillation is preferably conducted using, for example, a disc-type, conical-type, or cylinder-type refiner, a high-speed defibrating machine, a shear stirring machine, a colloid mill, a high-pressure jet dispersing machine, a beater, a PFI mill, a kneader, or a disperser in a wet manner (namely, with a dispersion in which the dispersion medium is water or the like), but there is not any particular limitation on such an apparatus, and any apparatus which imparts a mechanically defibrating force in a wet manner can be adopted.

The solid content concentration of the raw material in the dispersion of the chemically modified cellulose raw material, to be subjected to fibrillation, is preferably 0.1% by mass or more, further preferably 0.5% by mass or more, further preferably 1.0% by mass or more, further preferably 2.0% by mass or more. The upper limit of the concentration is preferably 40% by mass or less, further preferably 30% by mass or less, further preferably 10% by mass or less, further preferably 8% by mass or less. The dispersion medium is preferably water.

The pH of the dispersion of the chemically modified cellulose raw material, to be subjected to fibrillation, is preferably 7.0 or less, more preferably 6.0 or less, further preferably 5.0 or less. The lower limit of the pH is not particularly limited, and is usually 2.0 or more, preferably 3.0 or more, more preferably 3.5 or more. The pH can be adjusted by adding an acid such as hydrochloric acid to the dispersion.

The chemically modified cellulose raw material obtained by the above method may be dried and pulverized before preparation of the dispersion to be subjected to fibrillation. Next, the chemically modified cellulose raw material pulverized in a dry manner may be dispersed in the dispersion medium and subjected to fibrillation (in a wet manner). The apparatus for use in dry pulverization of the raw material is not particularly limited, and examples thereof can include impact mills such as a hammer mill and a pin mill, medium mills such as a ball mill and a tower mill, and jet mills.

Fibrillation is conducted so that the average fiber diameter is kept at 500 nm or more, preferably 1 μm or more, further preferably 10 μm or more, as described above. The upper limit of the average fiber diameter is preferably 60 μm or less, more preferably 40 μm or less, further preferably 30 μm or less, further preferably 20 μm or less. Proper fibrillation is conducted to such an extent that the average fiber diameter is in this range, to thereby allow high water retentivity to be exhibited as compared with a non-defibrated cellulose fiber and also allow high effect of imparting strength even in a small amount and effect of enhancing yield to be obtained as compared with a finely defibrated cellulose nanofiber.

As described above, fibrillation is preferably conducted so that the rate of fibrillation ($f_0$) of the chemically modified cellulose raw material before fibrillation increases by the fibrillation. When the rate of fibrillation of the fibrillated chemically modified cellulose fiber is designated as f, the difference in rate of fibrillation, $\Delta f = f - f_0$, may be more than 0, and is preferably 0.1% or more, more preferably 0.2% or more, more preferably 0.3% or more, more preferably 1.0% or more, further preferably 2.5% or more. The rate of fibrillation (Fibrillation %) can be measured with a fractionator manufactured by Valmet K.K.

EXAMPLES

Hereinafter, Examples and Comparative Examples of the present invention are more specifically described, but the present invention is not limited thereto. Unless particularly noted, "part(s)" and "%" respectively represent "part(s) by mass" and "% by mass".

Example 1

NBKP (manufactured by Nippon Paper Industries Co., Ltd.) was subjected to an oxidation treatment with TEMPO according to an ordinary method to produce a carboxylated cellulose raw material where the amount of a carboxyl group was 1.42 mmol/g. An aqueous dispersion having a solid content concentration of the raw material of 4% by mass was prepared, and treated using a Labo Refiner manufactured by Aikawa Iron Works Co., Ltd., for 10 minutes, to prepare a fibrillated carboxylated cellulose fiber. Each physical property value described in Table 1, of the fiber obtained, was measured. The method for measuring each physical property value is as described above. The results are shown in Table 1.

Example 2

A fibrillated carboxylated cellulose fiber was prepared in the same manner as in Example 1 except that TopFiner manufactured by Aikawa Iron Works Co., Ltd. was used. The results are shown in Table 1.

Example 3

A fibrillated carboxylated cellulose fiber was prepared in the same manner as in Example 2 except that the solid content concentration of the raw material was changed from 4% by mass to 2% by mass. The results are shown in Table 1.

Example 4

A fibrillated carboxylated cellulose fiber was prepared in the same manner as in Example 1 except that a carboxylated cellulose raw material where the amount of a carboxyl group was 0.60 mmol/g was used. The results are shown in Table 1.

Example 5

To a twin screw kneader regulated at a rotational speed of 100 rpm were added 130 parts of water and 20 parts of sodium hydroxide dissolved in 100 parts of water, and 100 parts of leaf pulp (LBKP manufactured by Nippon Paper Industries Co., Ltd.) in terms of dry mass in drying at 100° C. for 60 minutes was charged. A cellulose raw material mercerized was prepared by stirring and mixing at 30° C. for 90 minutes. One hundred parts of isopropanol (IPA) and 60 parts of sodium monochloroacetate were added with further stirring, stirred for 30 minutes, and thereafter heated to 70° C. to allow for a carboxymethylation reaction for 90 minutes. The concentration of IPA in the reaction medium in the carboxymethylation reaction was 30%. After completion of the reaction, neutralization was made with acetic acid so that the pH was about 7, and a carboxymethylated cellulose raw material (sodium salt) was obtained where the degree of carboxymethyl substitution was 0.21 and the degree of crystallization of cellulose type I was 72%. The rate of effective utilization of the carboxymethylating agent was 29%. The respective methods for measuring the degree of carboxymethyl substitution and the degree of crystallization of cellulose type I, and the method for calculating the rate of effective utilization of the carboxymethylating agent are as described above.

An aqueous dispersion in which the solid content concentration of the carboxymethylated cellulose raw material obtained was 4% by mass was prepared, and treated using Labo Refiner manufactured by Aikawa Iron Works Co., Ltd., for 10 minutes, to prepare a fibrillated carboxymethylated cellulose fiber. The results are shown in Table 1.

Example 6

A fibrillated carboxymethylated cellulose fiber was prepared in the same manner as in Example 4 except that the solid content concentration in the aqueous dispersion to be subjected to fibrillation was changed from 4% by mass to 2% by mass and TopFiner manufactured by Aikawa Iron Works Co., Ltd. was used. The results are shown in Table 1.

Example 7

A fibrillated carboxymethylated cellulose fiber was prepared in the same manner as in Example 5 except that a carboxymethylated cellulose raw material where the degree of carboxymethyl substitution was 0.36 was used. The results are shown in Table 1.

Comparative Example 1

An aqueous dispersion where the solid content concentration was 4% by mass was prepared with needle pulp (NBKP manufactured by Nippon Paper Industries Co., Ltd.) as a raw material, and treated using TopFiner manufactured by Aikawa Iron Works Co., Ltd., for 10 minutes, to prepare a cellulose fiber. The results are shown in Table 1.

TABLE 1

| | Type of chemical modification | Amount (mmol/g) of COOH group | Degree of carboxy methyl substitution | Degree of crystallization (%) | Average fiber length (mm) | Average fiber diameter (μm) | Water retention ability | Anionic charge density (meq/g) | Viscosity (mPa·s) at 60 rpm and 1% | Electric conductivity (mS/m) | BET specific surface area (m²/g) |
|---|---|---|---|---|---|---|---|---|---|---|---|
| Example 1 | Oxidation | 1.27 | — | 84 | 0.87 | 15.7 | 40 | 0.75 | 512 | 63 | 87 |
| Example 2 | Oxidation | 1.37 | — | 80 | 0.37 | 25.6 | 101 | 0.78 | 1820 | 26 | 151 |
| Example 3 | Oxidation | 1.37 | — | 87 | 1.21 | 15.8 | 20 | 0.49 | 145 | 46 | 65 |
| Example 4 | Oxidation | 0.60 | — | 87 | 0.49 | 16.4 | 26 | 0.23 | 80 | 19 | 72 |
| Example 5 | Carboxymethylation | — | 0.21 | 72 | 0.37 | 13.8 | 77 | 0.58 | 413 | 52 | 178 |
| Example 6 | Carboxymethylation | — | 0.21 | 70 | 0.54 | 13.8 | 120 | 0.61 | 1580 | 55 | 275 |
| Example 7 | Carboxymethylation | — | 0.36 | 59 | 0.46 | 13.4 | 119 | 1.47 | 840 | 90 | 274 |
| Comparative Example 1 | None | — | — | 64 | 1.73 | 16.3 | 13 | 0.05 | 125 | 5 | Not measured |

It is clear from the results in Table 1 that the fibrillated chemically modified cellulose fiber of the present invention (Examples 1 to 7) is higher in water retention ability than that of Comparative Example 1 with no chemical modification conducted.

Example 8

To 500 ml of an aqueous solution in which 39 mg (0.05 mmol per g of absolutely dried cellulose) of TEMPO (Sigma Aldrich) and 514 mg (1.0 mmol per g of absolutely dried cellulose) of sodium bromide were dissolved was added 5.00 g (absolute dry) of needle-derived bleached unbeaten kraft pulp (NBKP, manufactured by Nippon Paper Industries Co., Ltd., whiteness 85%), and stirred until pulp was uniformly dispersed. An aqueous sodium hypochlorite solution was added to the reaction liquid so that 5.5 mmol/g of sodium hypochlorite was achieved, and an oxidation reaction was initiated at room temperature. The pH in the liquid was reduced during the reaction, and an aqueous 3 M sodium hydroxide solution was sequentially added to adjust the pH to 10. When sodium hypochlorite was consumed to result in no change in pH in the liquid, the reaction was terminated. After hydrochloric acid was added to the mixture after the reaction to adjust the pH to 2, the pulp was separated by filtration with a glass filter, and the pulp separated was sufficiently washed with water to obtain TEMPO oxidized pulp (carboxylated cellulose raw material). The yield of the pulp here was 90%, the time taken for the oxidation reaction was 90 minutes, the amount of a carboxyl group was 1.37 mmol/g, and the pH was 4.5.

An aqueous dispersion in which the solid content concentration of the TEMPO oxidized pulp obtained was 2.0% by mass was prepared, subjected to adjustment of the pH to 7.5 due to addition of an aqueous 5% NaOH solution and sodium hydrogen carbonate, and thereafter treated using TopFiner (manufactured by Aikawa Iron Works Co., Ltd.) for 10 minutes, to obtain a fibrillated carboxylated cellulose fiber. Each physical property value described in Table 2, of the fiber obtained, was measured. The method for measuring each physical property value is as described above. The results are shown in Table 2.

Example 9

An aqueous dispersion in which the solid content concentration of the TEMPO oxidized pulp obtained in Example 8 was 4% by mass was prepared, subjected to adjustment of the pH to 8.6 due to addition of an aqueous 5% NaOH solution and sodium hydrogen carbonate, and thereafter treated using Labo Refiner manufactured by Aikawa Iron Works Co., Ltd., for 10 minutes, to obtain a fibrillated carboxylated cellulose fiber. The results are shown in Table 2.

Example 10

An aqueous dispersion in which the solid content concentration of the TEMPO oxidized pulp obtained in Example 8 was 30% by mass was prepared, and subjected to a treatment by use of Labo Refiner manufactured by Aikawa Iron Works Co., Ltd. twice, to obtain a fibrillated carboxylated cellulose fiber. The results are shown in Table 2.

Example 11

To a twin screw kneader regulated at a rotational speed of 100 rpm were added 130 parts of water and 20 parts of sodium hydroxide dissolved in 100 parts of water, and 100 parts of leaf-derived bleached unbeaten kraft pulp (LBKP manufactured by Nippon Paper Industries Co., Ltd.) in terms of dry mass in drying at 100° C. for 60 minutes was charged. A mercerized cellulose raw material was prepared by stirring and mixing at 30° C. for 90 minutes. One hundred parts of isopropanol (IPA) and 60 parts of sodium monochloroacetate were added with further stirring, stirred for 30 minutes, and thereafter heated to 70° C. to allow for a carboxymethylation reaction for 90 minutes. The concentration of IPA in the reaction medium in the carboxymethylation reaction was 30%. After completion of the reaction, neutralization was made with acetic acid so that the pH was about 7, and carboxymethylation pulp (sodium salt) was obtained.

The carboxymethylation pulp (carboxymethylated cellulose raw material) obtained was used to conduct fibrillation by the same method as in Example 8, thereby preparing a fibrillated carboxymethylated cellulose fiber. The results are shown in Table 2.

Example 12

After dry pulverization of carboxymethylation pulp produced by the same method as in Example 11, fibrillation was conducted by the same method as in Example 9 to obtain a fibrillated carboxymethylated cellulose fiber. The results are shown in Table 2.

As shown in Table 2, it is clear that a fibrillated chemically modified cellulose fiber not only has a properly low B type viscosity, but also has high thixotropy. It is considered that such a fiber can exhibit an excellent function in a wide range of applications.

The invention claimed is:

1. A fibrillated chemically modified cellulose fiber, wherein a degree of crystallization of cellulose type I is 50% or more, an anionic charge density is 0.10 meq/g or more and 2.00 meq/g or less, and an average fiber diameter is 10 µm or more, and wherein a chemically modified cellulose in the fibrillated chemically modified cellulose is a carboxylated cellulose obtained by oxidizing a cellulose raw material with an N-oxyl compound, an oxidant, and a compound selected from the group consisting of bromide, iodide and a mixture thereof.

2. The fibrillated chemically modified cellulose fiber according to claim 1, wherein when water is used to prepare 40 mL of a slurry having a solid content of 0.3% by mass and the slurry is then subjected to centrifugation with a centrifuge machine at 30° C. and 25000 G for 30 minutes to separate an aqueous phase and a precipitate, a water retention ability calculated using the following expression is 15 or more:

Water retention ability=$(B+C-0.003 \times A)/(0.003 \times A - C)$ wherein A represents a mass of the slurry to be subjected to the centrifugation, B represents a mass of the precipitate separated, and C represents a mass of a solid content in the aqueous phase separated.

3. The fibrillated chemically modified cellulose fiber according to claim 1, wherein a B type viscosity (25° C., 60 rpm) in the form of an aqueous dispersion having a solid content of 1% by mass is 2500 mPa·s or less.

4. A fibrillated chemically modified cellulose fiber, wherein a value (A/B) obtained by dividing a viscosity A measured at a shear rate of 0.01/sec by a viscosity B measured at a shear rate of 1000/sec is 100 or more for an aqueous dispersion having a solid content of 1% by mass, and wherein an average fiber diameter is 10 µm or more, and wherein a chemically modified cellulose in the fibrillated chemically modified cellulose is a carboxylated cellulose obtained by oxidizing a cellulose raw material with an N-oxyl compound, an oxidant, and a compound selected from the group consisting of bromide, iodide and a mixture thereof.

5. The fibrillated chemically modified cellulose fiber according to claim 4, wherein the viscosity A measured at a shear rate of 0.01/sec is 1000 to 10000000 mPa·s and the

TABLE 2

| Type of chemical modification | | Example 8 Oxidation | Example 9 Oxidation | Example 10 Oxidation | Example 11 Carboxy methylation | Example 12 Carboxy methylation |
|---|---|---|---|---|---|---|
| Amount of COOH group | mmol/g | 1.37 | 1.37 | 1.37 | — | — |
| Degree of substitution | | — | — | — | 0.21 | 0.25 |
| Degree of crystallization | % | 80 | 84 | 81 | 70 | 74 |
| Anionic charge density | meq/g | 0.78 | 0.75 | 0.55 | 0.61 | 0.53 |
| Average fiber diameter | µm | 17.8 | 15.7 | 18.7 | 13.2 | 15.7 |
| Average fiber length | mm | 0.37 | 0.87 | 0.46 | 0.55 | 0.35 |
| Aspect ratio | | 21 | 55 | 25 | 42 | 22 |
| Specific surface area | m²/g | 182 | 82 | 170 | 257 | 188 |
| Water retention ability | | 101 | 40 | 18 | 120 | 51 |
| B type viscosity | mPa·s | 1820 | 512 | 26 | 1580 | 79 |
| Viscosity A | mPa·s | 1350000 | 392000 | 649 | 133000 | 2770 |
| Viscosity B | mPa·s | 76.8 | 28.3 | 8.24 | 63.1 | 19.7 |
| Viscosity A/Viscosity B | | 17578 | 13852 | 79 | 2108 | 141 | viscosity B measured at a shear rate of 1000/sec is 1 to 1000 mPa·s for an aqueous dispersion having a solid content of 1% by mass.

6. The fibrillated chemically modified cellulose fiber according to claim 4, wherein a viscosity (25° C., 60 rpm) in the form of an aqueous dispersion having a solid content of 1% by mass is 40 to 4000 mPa·s.

7. The fibrillated chemically modified cellulose fiber according to claim 4, wherein an aspect ratio is 10 to 100.

8. The chemically modified cellulose fiber according to claim 4, wherein a degree of crystallization of cellulose type I is 50% or more, an anionic charge density is 0.08 meq/g or more and 2.50 meq/g or less, and an average fiber diameter is more than 500 nm.

9. The fibrillated chemically modified cellulose fiber according to claim 1, wherein the carboxylated cellulose has an amount of a carboxyl group of 0.1 to 2.5 mmol/g based on an absolute dry mass of the fibrillated chemically modified cellulose fiber.

10. The fibrillated chemically modified cellulose fiber according to claim 2, wherein a B type viscosity (25° C., 60 rpm) in the form of an aqueous dispersion having a solid content of 1% by mass is 2500 mPa·s or less.

11. The fibrillated chemically modified cellulose fiber according to claim 5, wherein a viscosity (25° C., 60 rpm) in the form of an aqueous dispersion having a solid content of 1% by mass is 40 to 4000 mPa·s.

12. The fibrillated chemically modified cellulose fiber according to claim 11, wherein an aspect ratio is 10 to 100.

13. The chemically modified cellulose fiber according to claim 12, wherein a degree of crystallization of cellulose type I is 50% or more, an anionic charge density is 0.08 meq/g or more and 2.50 meq/g or less, and an average fiber diameter is more than 500 nm.

14. The fibrillated chemically modified cellulose fiber according to claim 4, wherein the carboxylated cellulose has an amount of a carboxyl group of 0.1 to 2.5 mmol/g based on an absolute dry mass of the fibrillated chemically modified cellulose fiber.

* * * * *